US011480106B2

(12) United States Patent
Morin et al.

(10) Patent No.: US 11,480,106 B2
(45) Date of Patent: Oct. 25, 2022

(54) ACOUSTIC LINER WITH OBLIQUELY ANGLED SLOTS

(71) Applicant: United Technologies Corporation, Farmington, CT (US)

(72) Inventors: Bruce L. Morin, Longmeadow, MA (US); Anthony R. Bifulco, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 312 days.

(21) Appl. No.: 16/411,728

(22) Filed: May 14, 2019

(65) Prior Publication Data
US 2020/0347785 A1 Nov. 5, 2020

Related U.S. Application Data

(60) Provisional application No. 62/843,111, filed on May 3, 2019.

(51) Int. Cl.
 *F02C 7/24* (2006.01)
(52) U.S. Cl.
 CPC .......... *F02C 7/24* (2013.01); *F05D 2260/964* (2013.01)
(58) Field of Classification Search
 CPC ....... F02C 7/045; F02C 7/24; F05D 2250/283
 See application file for complete search history.

(56) References Cited

U.S. PATENT DOCUMENTS

| 7,540,354 | B2 | 6/2009 | Morin et al. |
| 8,602,156 | B2* | 12/2013 | Ali .......................... F02C 7/045 |
| | | | 181/214 |
| 9,604,438 | B2 | 3/2017 | Lumbab et al. |
| 2010/0206664 | A1* | 8/2010 | Bagnall ................ G10K 11/172 |
| | | | 181/214 |
| 2015/0110603 | A1 | 4/2015 | Biset et al. |
| 2016/0215700 | A1* | 7/2016 | Yu ........................... B64D 33/02 |
| 2017/0089238 | A1* | 3/2017 | Leyko .................. F23M 20/005 |
| 2018/0016981 | A1 | 1/2018 | Herrera et al. |
| 2018/0016987 | A1 | 1/2018 | Howarth et al. |
| 2018/0029719 | A1* | 2/2018 | Follet ...................... F01D 25/24 |
| 2018/0218723 | A1* | 8/2018 | Lin ........................... B32B 7/08 |

OTHER PUBLICATIONS

Howerton, B.M. and Jones, M.G. (2016). Acoustic liner drag: Measurements on novel facesheet perforate geometries. American Institute of Aeronautics and Astronautics. Retrieved May 9, 2019 from: https://ntrs.nasa.gov/search.jsp?R=20160009095.
International Search Report for International Application No. PCT/US2020/031364 completed Jul. 30, 2020.
International Preliminary Report on Patentability for International Application No. PCT/US2020/031364 dated Nov. 18, 2021.

\* cited by examiner

*Primary Examiner* — Craig Kim
(74) *Attorney, Agent, or Firm* — Carlson, Gaskey & Olds, P.C.

(57) ABSTRACT

An acoustic liner for a gas turbine engine includes an acoustic panel that is curved about a central axis. The acoustic panel includes a support backing, a face sheet, and a cellular structure disposed between the support backing and the face sheet. The face sheet has elongated slots that extend along respective slot centerlines in the plane of the face sheet. The slot centerlines are sloped at oblique angles to the central axis.

18 Claims, 6 Drawing Sheets

ACOUSTIC LINER WITH OBLIQUELY ANGLED SLOTS

CROSS-REFERENCE TO RELATED APPLICATION

This application claims priority to U.S. Patent Application No. 62/843,111 filed May 3, 2019.

BACKGROUND

Gas turbine engines generate audible frequencies during operation, commonly considered to be "noise." Acoustic liners are used to attenuate such noise. A typical acoustic liner includes a cellular structure sandwiched between a back sheet and a perforated face sheet. The liner may be used in the fan case or nacelle of the engine.

SUMMARY

An acoustic liner for a gas turbine engine according to an example of the present disclosure includes an acoustic panel that is curved about a central axis. The acoustic panel has a support backing, a face sheet, and a cellular structure disposed between the support backing and the face sheet. The face sheet has elongated slots extending along respective slot centerlines in the plane of the face sheet. The slot centerlines are sloped at oblique angles to the central axis.

In a further embodiment of any of the foregoing embodiments, each elongated slot defines a slot length (L) and a slot width (W), and a ratio of L to W is from 2 to 10.

In a further embodiment of any of the foregoing embodiments, the elongated slots are arranged in multiple circumferential rows.

In a further embodiment of any of the foregoing embodiments, each elongated slot defines a slot width (W), the elongated slots define a slot-to-slot spacing (S), and a ratio of S to W is from 2 to 10.

In a further embodiment of any of the foregoing embodiments, the elongated slots are linear.

In a further embodiment of any of the foregoing embodiments, the elongated slots are parallel to each other.

In a further embodiment of any of the foregoing embodiments, the oblique angles are from 37° to 65°.

In a further embodiment of any of the foregoing embodiments, each elongated slot defines a slot length (L) and a slot width (W), a ratio of L to W is from 2 to 10, the elongated slots are arranged in multiple circumferential rows, the elongated slots define a slot-to-slot spacing (S), and a ratio of S to W is from 2 to 10.

In a further embodiment of any of the foregoing embodiments, each elongated slot defines a slot width (W), face sheet defines a thickness (T), width (W) is from 0.005 to 0.07 inches, and thickness (T) is from 0.02 to 0.1 inches.

In a further embodiment of any of the foregoing embodiments, elongated slots are arranged in adjacent slot patterns, each elongated slot defines a slot width (W), each one of the adjacent slot patterns defines a minimum pattern-to-pattern gap (G), and a ratio of the pattern-to-pattern gap (G) to the slot width (W) is 2 or greater.

In a further embodiment of any of the foregoing embodiments, the face sheet varies in hardness.

In a further embodiment of any of the foregoing embodiments, the elongated slots are aligned with cells of the cellular structure.

A gas turbine engine according to an example of the present disclosure includes a fan rotatable about a central engine axis. A fan case surrounds the fan. The fan case has an acoustic liner that has one or more acoustic panels. The one or more acoustic panels is curved about the central engine axis. Each acoustic panel includes a support backing, a face sheet, and a cellular structure disposed between the support backing and the face sheet,. The face sheet has elongated slots extending along respective slot centerlines in the plane of the face sheet. The slot centerlines is sloped at oblique angles to the central engine axis.

In a further embodiment of any of the foregoing embodiments, each elongated slot defines a slot length (L) and a slot width (W), and a ratio of L to W is from 2 to 10.

In a further embodiment of any of the foregoing embodiments, the elongated slots are arranged in multiple circumferential rows.

In a further embodiment of any of the foregoing embodiments, each elongated slot defines a slot width (W), the elongated slots define a slot-to-slot spacing (S), and a ratio of S to W is from 2 to 10.

The gas turbine engine as recited in claim 13, wherein the elongated slots are linear and parallel to each other, and the oblique angles are from 37° to 65°.

In a further embodiment of any of the foregoing embodiments, each elongated slot defines a slot width (W), face sheet defines a thickness (T), slot width (W) is from 0.005 to 0.07 inches, and thickness (T) is from 0.02 to 0.1 inches.

In a further embodiment of any of the foregoing embodiments, the elongated slots are arranged in adjacent slot patterns. Each elongated slot defines a slot width (W), each one of the adjacent slot patterns defines a minimum pattern-to-pattern gap (G), and a ratio of the minimum pattern-to-pattern gap (G) to slot width (W) is 2 or greater.

A gas turbine engine according to another example of the present disclosure includes according to any of the forgoing embodiments.

A method of fabricating a face sheet for an acoustic liner according to an example of the present disclosure includes forming a face sheet by additive manufacturing. The face sheet is curved about a central axis and that has elongated slots extending along respective slot centerlines in the plane of the face sheet.

In a further embodiment of any of the foregoing embodiments, the face sheet is formed on a cellular structure and the slot centerlines are sloped at oblique angles to the central axis.

In a further embodiment of any of the foregoing embodiments, the elongated slots are formed in alignment with cells of the cellular structure.

In a further embodiment of any of the foregoing embodiments, the face sheet is fused directly to the cellular structure without an adhesive.

In a further embodiment of any of the foregoing embodiments, the additive manufacturing uses polymers of different hardnesses such that the face sheet varies in hardness.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
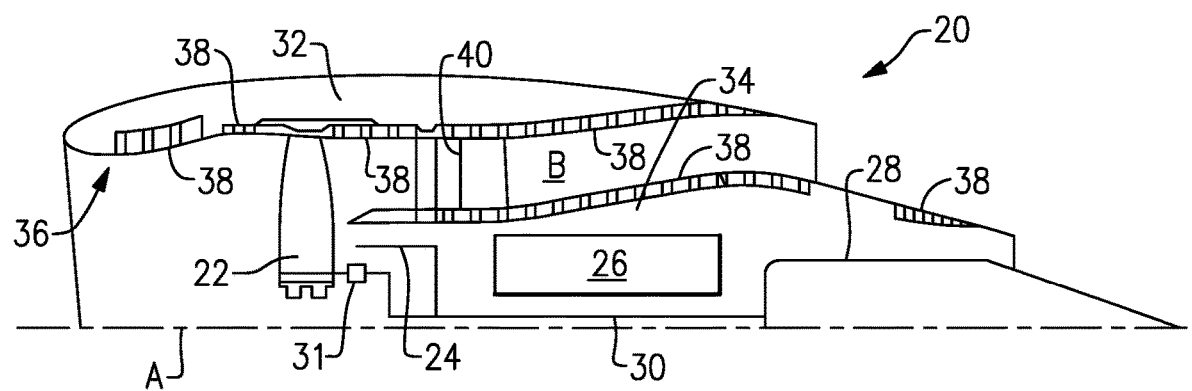
FIG. 1 illustrates an example gas turbine engine.

FIG. 1 schematically illustrates a gas turbine engine 20. The engine 20 generally includes a fan 22, a compressor section 24, a combustor 26, and a turbine section 28. The turbine section 28 is coupled by a shaft 30 to the compressor section 24 and the fan 22, which are all rotatable about a central engine axis A. The shaft 30 may be coupled through a speed reduction gear 31 to the fan 22. A housing 32, such as a casing and/or nacelle, surrounds the fan 22. A core case 34 surrounds the core engine components, such as the compressor section 24 and the turbine section 28. The portion of the housing 32 aft of the fan 22 and the core case 34 define a bypass passage B there between. The portion of the housing 32 forward of the fan 22 defines an inlet region 36.

A portion of incoming air from the inlet region 36 enters the core engine and is pressurized in the compressor section 24. The pressurized air is provided to the combustor 26, where the air is mixed with fuel and ignited to produce a high velocity gas flow that expands through the turbine section 28. The turbine section 28 rotationally drives the compressor section 24 and the fan 22 via the shaft 30. The rotation of the fan 22 moves air from the inlet region 36 through the bypass passage B to provide thrust. Although shown schematically, this disclosure is not limited to the depicted engine architecture.

Operation of the engine 20 may produce noise. In this regard, the housing 32 includes one or more acoustic liners 38 for reducing noise. In the example shown, the housing 32 includes acoustic liners 38 forward of the fan 22 in the inlet region 36 and forward fan case, another acoustic liner 38 at an inter-stage location between the fan 22 and exit guide vanes 40, a trailing acoustic liner 38 aft of the exit guide vanes 40, and an acoustic liner 38 in the tailpipe. The liners 38 in the housing 32 are located on the outer boundary of the inlet region 36 and bypass passage B. Additionally, the core case 34 can include an acoustic liner 38 on the inner boundary of the bypass passage B and/or in the tailpipe. As will be appreciated, such locations are for example only, and acoustic liners 38 may be excluded from one or more of the locations shown and/or additionally used elsewhere in the engine 20.

Figure 2:
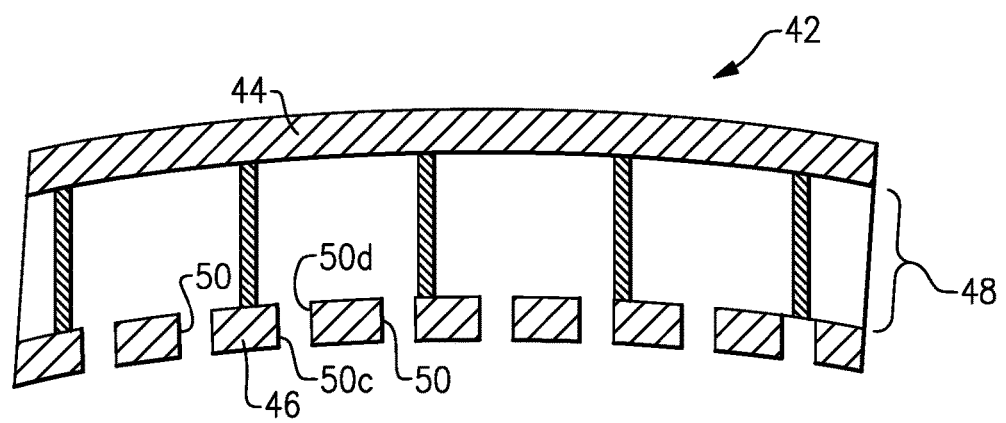
FIG. 2 illustrates a sectioned view of an acoustic panel of a liner.

The acoustic liner 38 is generally provided as an annular structure. In this regard, the acoustic liner 38 can be constructed of one or more acoustic panels 42, a representative one of which is shown in cross-section in FIG. 2. The one or more panels 42 are curved about a central axis which is coincident with the central engine axis A. The panel 42 may be attached to a structural portion of the housing 32 or core case 34 in a known manner, such as with fasteners. For instance, panels 42 may be provided as arc segments that are attached to provide the annular structure.

Figure 3:
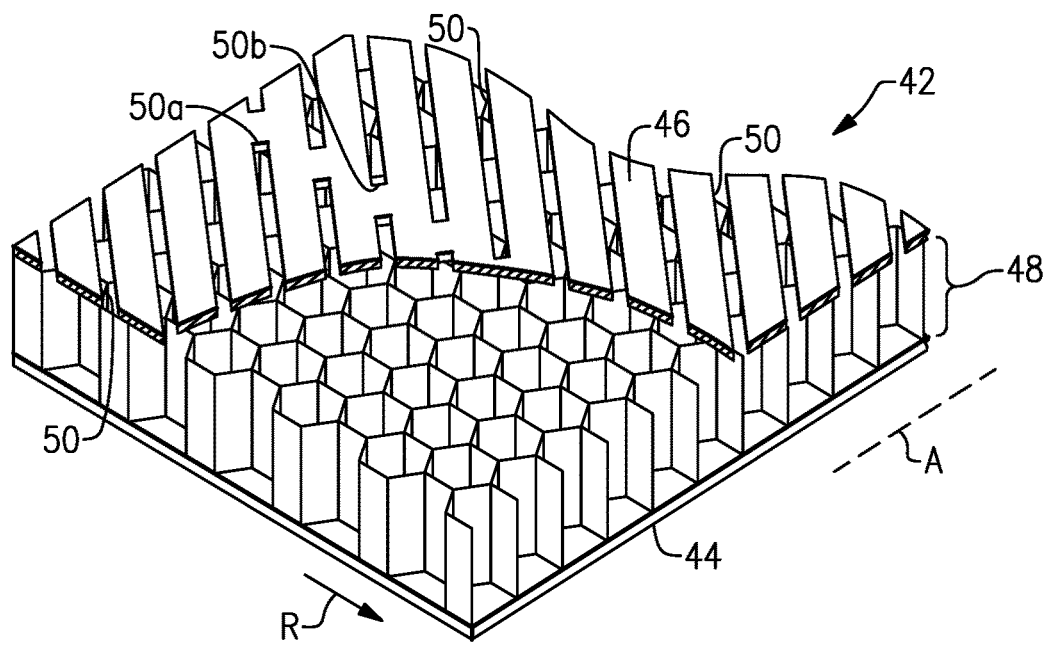
FIG. 3 illustrates a cutaway view of a portion of the acoustic panel.
Figure 4:
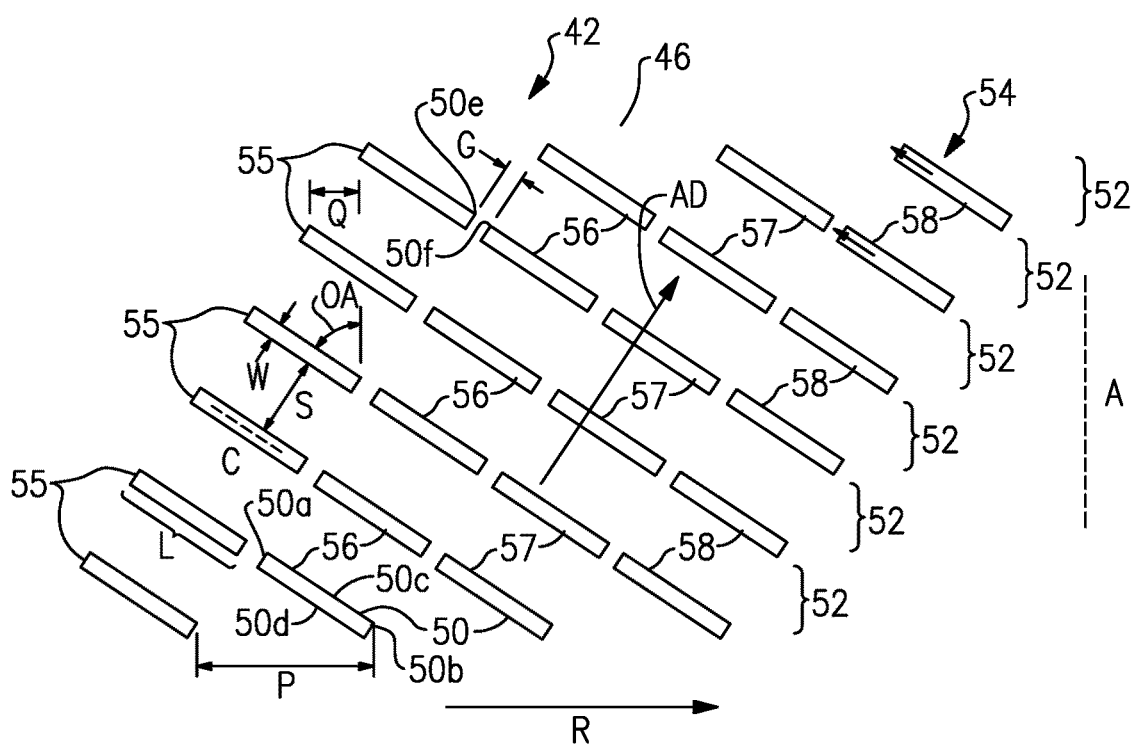
FIG. 4 illustrates a plan view of a portion of the acoustic panel.

Referring also to FIG. 3 that illustrates a cutaway view of a portion of the panel 42 and FIG. 4 that illustrates a plan view of a portion of the panel 42, the panel 42 includes a support backing 44 (e.g., a back sheet), a face sheet 46, and a cellular structure 48 (e.g., a honeycomb structure) disposed between the support backing 44 and the face sheet 46. The face sheet 46 faces toward, and is exposed to, the acoustic environment, which in the illustrated engine 20 is the bypass passage B or inlet region 36.

The support backing 44, the face sheet 46, and the cellular structure 48 can be composed of metal alloys, polymers, or composites, and may be attached together, such as with an adhesive, soldering, or brazing, as applicable. As shown, the architecture of the panel 42, having a single layer of the cellular structure 48, is what is known as a "single degree of freedom" construction. As will be appreciated, this disclosure is not limited to such architectures and the examples herein can also be applied to "double degree of freedom" constructions, "three degree of freedom" constructions, as well as other architectures.

The face sheet 46 defines elongated slots 50 that extend along respective slot centerlines C in the plane of the face sheet 46. The slots 50 of the face sheet 46 combined with the cellular structure 48 produces a resonant acoustic liner which dissipates acoustic energy as air alternately pumps into and out of the face sheet 46 due to acoustic excitation of the resonant liner. Each slot 50 defines a first, or axially aft, slot end 50a, a second, or axially forward, slot end 50b, and sides 50c-50d that join the ends 50a/50b. In the illustrated example, the slots 50 are generally rectangular in that the sides 50c-50d are parallel along the length of the slot 50 and the ends 50a/50b are squared. However, the slots 50 are not limited to such a shape. For instance, the ends 50a/50b may be rounded to eliminate definitive corners. Most typically, however, at least the sides 50c-50d will be parallel to facilitate manufacturing and slot spacing. The slots 50 may be formed in the face sheet 46 by machining, laser cutting, stamping, additive manufacturing or other similar technique.

Figure 5A:
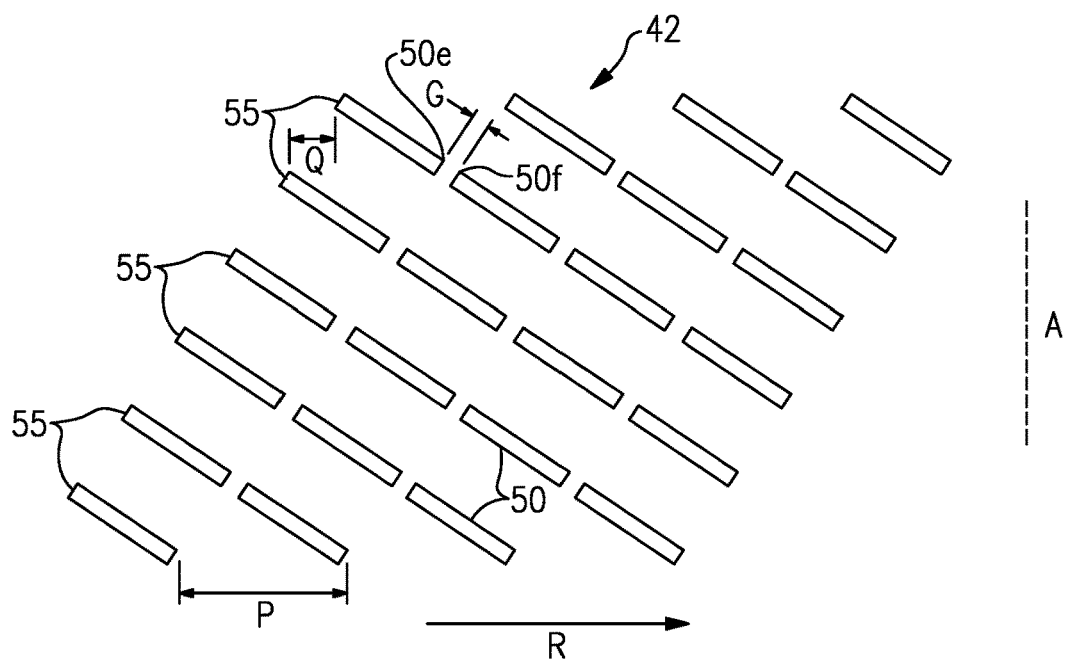
FIG. 5A illustrates another example of the acoustic panel with a positive offset slot pattern.
Figure 5B:
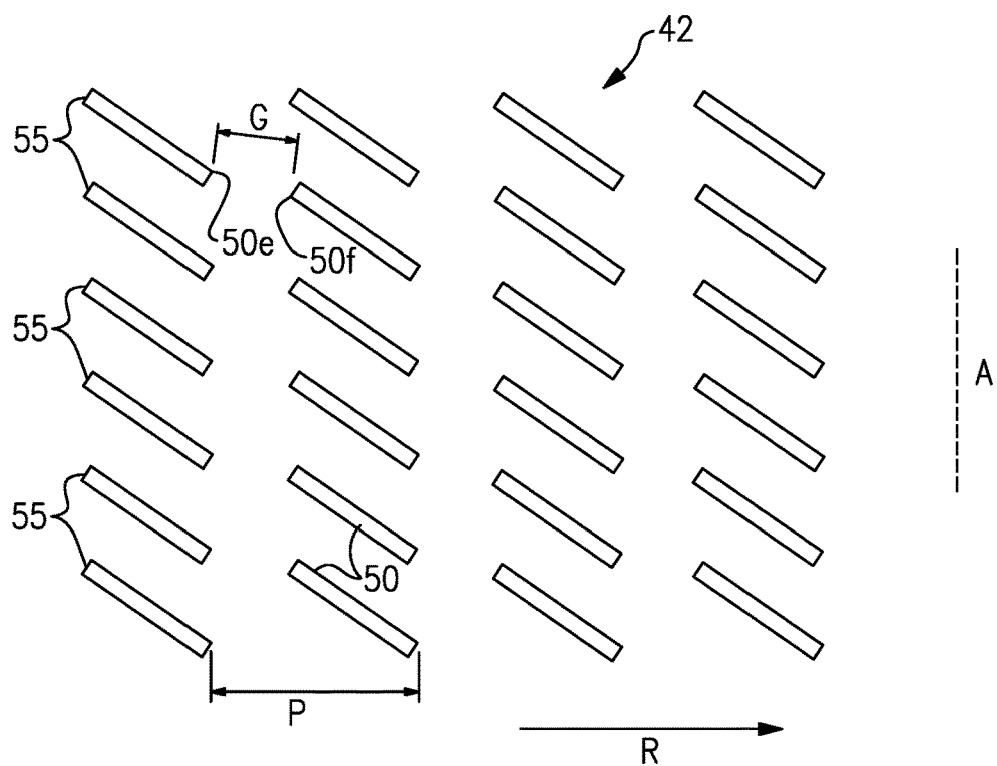
FIG. 5B illustrates another example of the acoustic panel with a zero offset slot pattern.
Figure 5C:
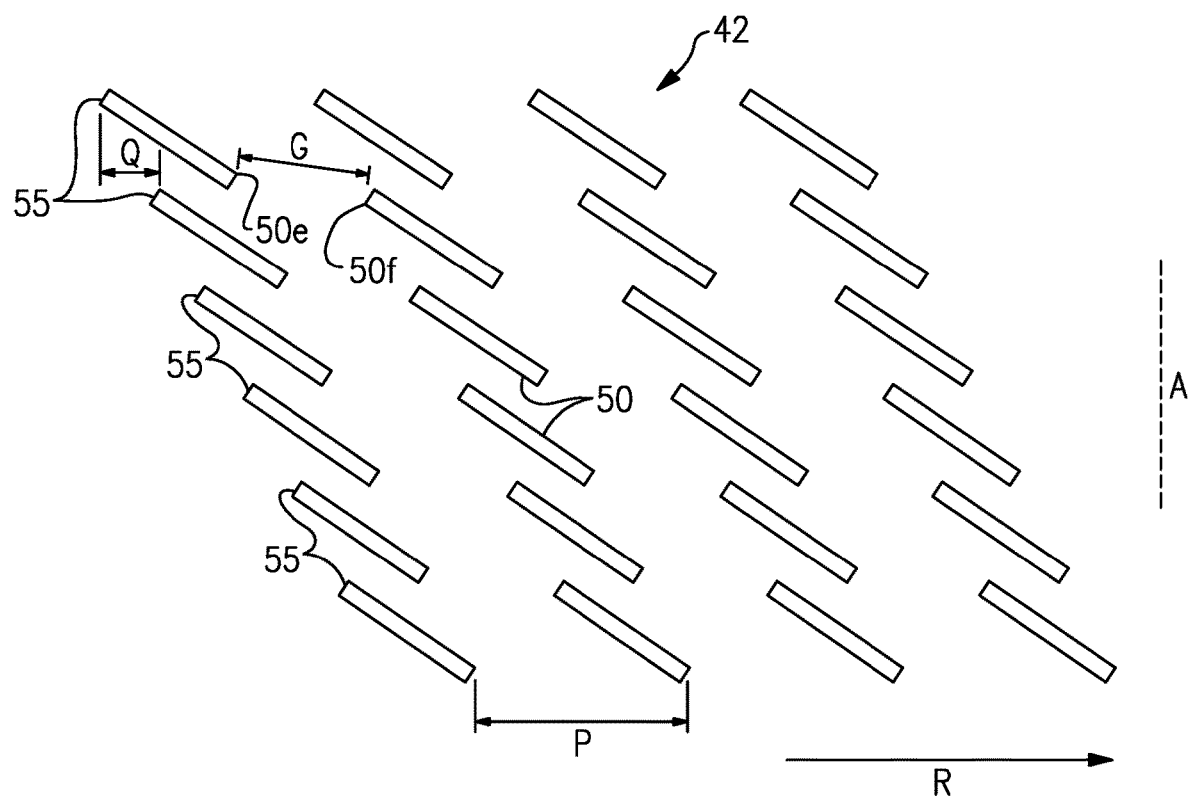
FIG. 5C illustrates another example of the acoustic panel with a negative offset slot pattern.

With reference to FIG. 4, the slots 50 are provided in a pattern as represented at 55 that is defined by the number of slot rows 52, the slot width (W), the slot angle (OA) relative to the engine axis A, the ratio of the slot length (L) to slot width (W), the ratio of the slot spacing (S) to slot width (W), and the ratio of slot offset (Q) to slot length (L). The slot length (L) is the end-to-end length between the ends 50a/50b taken along the slot centerlines C, while the slot width (W) is the distance between the sides 50c-50d taken perpendicular to the slot centerline C. The slot-to-slot spacing (S) is the distance between the side 50c of one slot 50 and the side 50d of the next adjacent slot 50 taken perpendicular to the slot centerlines C. The slot offset (Q) is the circumferential spacing between ends 50a of adjacent slots 50, measured in the direction of fan rotation, which is denoted by R in FIG. 4. FIGS. 5A, 5B, and 5C show, respectively, three exemplary slot patterns. In FIG. 5A the slot pattern has a positive offset, in FIG. 5B the slot pattern has a zero offset, and in FIG. 5C the slot pattern has a negative offset. The positive or negative offsets are taken with regard to the direction of fan rotation R, in which offset in the direction of fan rotation R is positive and offset in the direction opposite the fan direction is negative.

Figure 6:
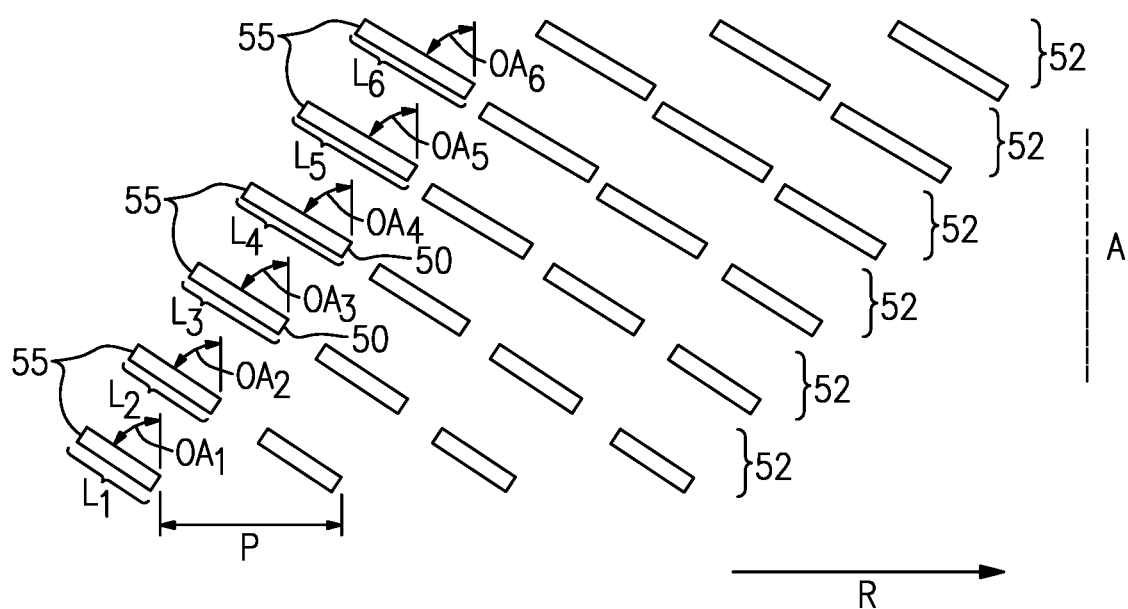
FIG. 6 illustrates another example of the acoustic panel in which slot length and slot angle vary.

In the illustrated example, the parameters that define the slot pattern are the same for each slot. However, the slot pattern is not limited to such a configuration and may contain slots of different width, angle, length, spacing and offset in order to reduce aerodynamic losses, increase acoustic attenuation and improve impact resistance of the face sheet. For example, FIG. 6 shows a slot pattern with slot length (L) and slot angle (OA) varying between the rows 52. Such a configuration may be desirable to strengthen the face sheet near the fan trailing edge where impact resistance is most important, and to better align the slots as the airflow angle evolves downstream from the fan.

Also with reference to FIG. 4, the face sheet 46 may have one or more slot patterns, for example 55, 56, 57 and 58, which are circumferentially spaced by the pitch (P). The pitch (P) establishes the smallest or minimum pattern-to-pattern gap (G) between the two closest points, 50e and 50f, on adjacent patterns, for example slot patterns 55 and 56. In the illustrated example, the slot patterns 55, 56, 57 and 58 are identical to each other and uniformly spaced. However, the face sheet is not limited to such a configuration and may contain different slot patterns and pitches.

Figure 7:
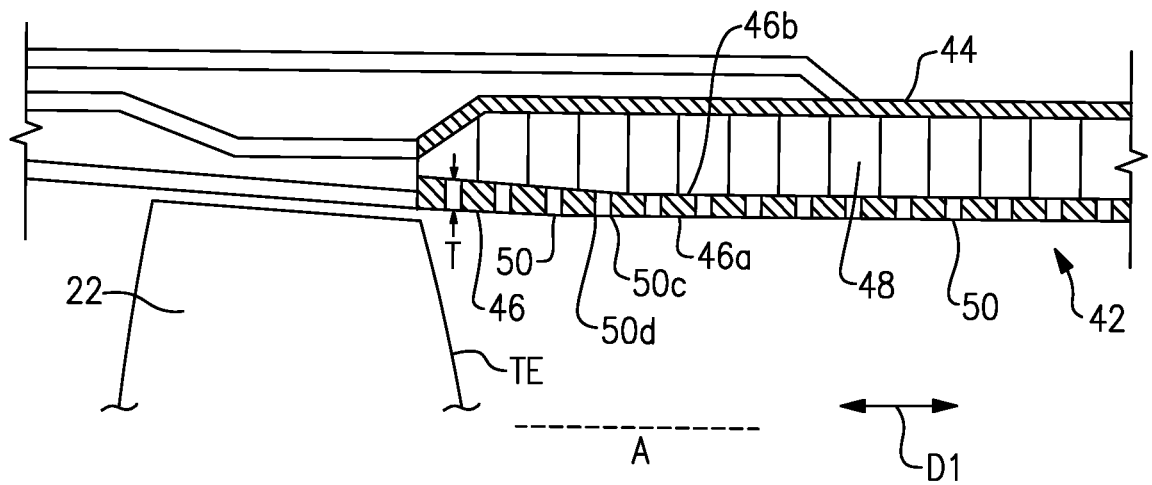
FIG. 7 illustrates yet another example of the acoustic panel.

With reference to FIG. 7, the slotted face sheet 46 has thickness (T), which is the distance between surface 46a and surface 46b taken perpendicular to surface 46a. To improve impact resistance, the thickness (T) may be variable in a direction D1, which may be parallel to the engine axis A. For example, the slotted face sheet 46 may have its thickest value near the fan 22 trailing edge TE to improve its capability to withstand impact from ice that may be shed from the fan 22.

As shown in the figures, the slots 50, or at least groups of the slots 50, are parallel to each other. Additionally, the slots 50, or at least groups of the slots 50, are all of the same length and width. As also shown in FIG. 4, the slots 50, or groups of slots 50, can be arranged in a circumferential row 52 (the central engine axis A is shown for reference). In the illustrated example, the slots 50 are arranged in six circumferential rows, but additional or fewer circumferential rows may be used.

Perforations in acoustic liners can create drag that debits aerodynamic performance of an engine. In this regard, the slots 50 of the panel 42 are sloped with regard the angular orientations of the slots 50 to the central engine axis A to reduce drag. For example, each slot 50 is sloped at an oblique angle (OA) to the central axis about which the panel 42 is curved (i.e., the central engine axis A). For instance, the angles are defined by the slot centerlines C and the central engine axis A. As an example, the angles (OA) are from 37° to 65°. In this regard, because of the slope of the slots 50, the axially aft slot end 50a of each slot 50 is circumferentially offset from the axially forward slot end 50b of the slot 50.

In embodiments, the slots 50, or at least groups of the slots 50, are all of the same angle (OA). In further examples, a plurality of circumferentially consecutive slots 50 in each circumferential row 52, such as five slots, ten slots, twenty-five slots, or all of the slots 50 in the circumferential row 52, have the same angle (OA). In yet a further example, all or at least a group of slots 50 in a circumferential row 52 have the same angle (OA) as all or at least a group of slots 50 in another circumferential row 52.

To reduce drag, the slots 50 are oriented at the angles (OA) such that the slots 50 are approximately perpendicular to an expected airflow direction, represented at AD in FIG. 4. In this regard, the panel 42 may especially be employed in locations aft of the fan 22 where there is directional oblique airflow from the fan and, in particular, at an inter-stage location between the fan 22 and the exit guide vanes 40. The airflow in this inter-stage location, prior to being straightened by the exit guide vanes, is non-axial. The slots 50 are angled such that the non-axial airflow moves across the slots 50 rather than travelling substantially along the length of the slots 50.

For instance, the airflow direction may be the airflow from the fan 22 at an acoustic certification condition, such as the approach, lateral or flyover condition, and may be determined from computer simulation and/or engine testing. As an example, the airflow direction is from about 30° to 48° with respect to the angle formed with the engine central axis A. The orientation of the slots 50 to reduce drag may also be represented with regard to a slot texture 54 (e.g., see FIG. 4). The slots 50 collectively define the slot texture 54, schematically shown with single-headed arrows aligned with the slot centerlines C. The slot texture 54 is determined by the angles (OA) of the slots 50 and the relative axial and circumferential positions of the ends 50a/50b. For instance, in FIG. 4, the axially forward slot end 50b is situated axially upstream, or forward, of the axially aft slot end 50a with respect to the airflow through the engine 20 from the front of the engine (at the inlet region 36) to the back of the engine 20. The ends 50a/50b are also circumferentially offset. Such a configuration establishes a sloped directionality along the slot centerlines C from the axially forward slot end 50b to the axially aft slot end 50a. The single-headed arrows represent this directionality and thus the slot texture 54. As will be appreciated, the slot texture 54 is not limited to texture of rectangular elongated slots 50, and slots having other geometries with upstream and downstream ends may likewise define a slot texture.

The fan 22 rotates in a rotational direction, which is represented at R in FIG. 4. The rotational direction R establishes a circumferentially forward direction in the direction of the rotation and a circumferentially aft direction opposite to the direction of the rotation. The rotational direction R of the fan 22 is against the slot texture 54. That is, the axially forward slot ends 50b are circumferentially forward of the axially aft slot ends relative to the rotational direction R of the fan 22. Thus, for a given rotating blade on the fan 22 and each given slot 50, the blade passes by the circumferential position of the axial aft slot end 50a of the slot 50 before then passing by the circumferential position of the axially forward slot end 50b of that slot 50. Airflow coming off the fan 22 at an oblique angle that lies between the rotation direction R and the axis A must therefore pass across the slots 50 rather than substantially down the lengths of the slots 50, which facilitates a reduction in drag. In this regard, even if the airflow is not substantially perpendicular to the slots 50, having rotational direction R of the fan 22 be against the slot texture 54 ensures that much of the airflow will have to pass across the slots 50 as desired for reduced drag.

The face sheet 46 and slots 50 may be designed to enhance acoustic attenuation and drag reduction, and must be able to withstand impact from ice that may shed from the fan. To achieve those objectives, for example, the face sheet thickness (T) is from 0.02 to 0.1 inches, the slot width (W) is from 0.005 to 0.07 inches, the ratio of the slot length (L) to the slot width (W) is from 2 to 10, the ratio of the slot-to-slot spacing (S) to the slot width (W) is from 2 to 10, and the ratio of pattern-to-pattern gap (G) to slot width (W) is 2 or greater (where each parameter is measured in inches or equivalent units and each of the ratios specified is non-dimensional).

The face sheet 46 and slots 50 can be fabricated by subtractive machining, such as by using shaped tools and secondary processes to cut the slots 50 and smooth the edges of the slots 50. Alternatively, additive manufacturing can be used to fabricate the face sheet 46 and slots 50. For instance, additive manufacturing may enable smoother surfaces and edges that are free or substantially free of burrs to further reduce drag, as well as more complex geometries. Additionally, additive manufacturing may enable the pattern of the slots 50 to be produced in alignment with the cells of the cellular structure 48 and avoid or reduce configurations in which the slots 50 overlap the walls of the cellular structure 48 so that the walls do not block the slots 50. Additive manufacturing also enables a wider variety of possible materials for the face sheet 46, as additive manufacturing can be conducted for metals or polymers. In this regard, the face sheet 46 can be composed of a relatively low hardness or durometer polymer, which can serve to further absorb sound and/or enhance foreign object impact resistance. Additionally, in bonded covers, the adhesive may fill the cell cavity or block the face sheet opening. Additive manufacturing eliminates the need for adhesive, thereby avoiding reduction in cavity volume and blockage of the slots 50.

In general terms, additive manufacturing techniques allow for the creation of a component, such as the face sheet 46, by building the component with successively added layers; e.g., layers of powdered material. In the additive manufacturing process, one or more materials are deposited on a surface in a layer. In some instances, the layers are subsequently compacted. The powder material(s) of the layer may be subsequently fused using any one of a number of known processes (e.g., laser, electron beam, etc.). Typically, the deposition of the material (i.e. the geometry of the deposition later for each of the materials) is computer controlled using a three-dimensional computer aided design (CAD) model. The three-dimensional (3D) model is converted into a plurality of slices, with each slice defining a cross section of the component for a predetermined height (i.e. layer) of the 3D model. The additively manufactured component is then "built" layer by layer; e.g., a layer of powdered material(s) is deposited and then fused, and then the process is repeated for the next layer.

Examples of additive manufacturing processes that can be used with the present disclosure include, but are not limited to, Stereolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Direct Metal Laser Sintering (DMLS), "material extrusion" or fused filament fabrication (FFF), "vat polymerization" such as stereolithography (SLA) and digital light projection (DLP), polyjet, and selective laser sintering (SLS), and others. The present disclosure is not limited to using any particular type of additive manufacturing process.

Figure 8:
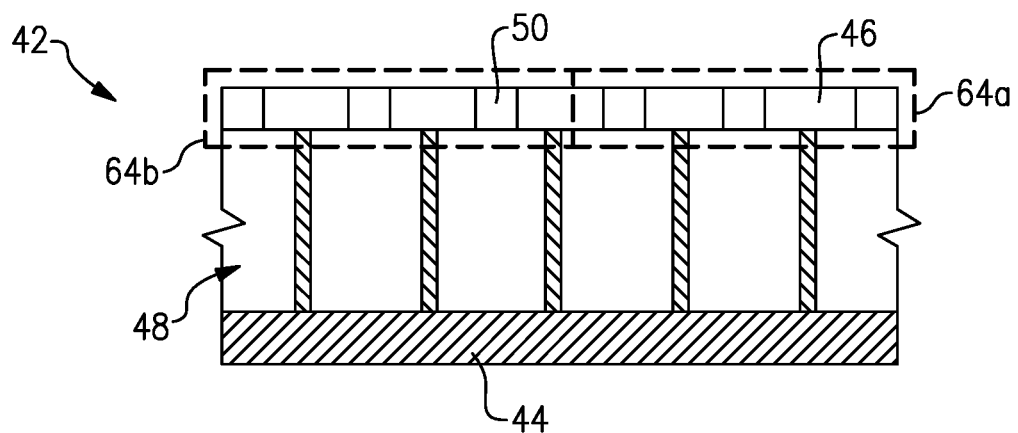
FIG. 8 illustrates a further example of an acoustic panel.

As an example, FIG. 8 shows a sectioned view of a further example of the panel 42 in which the face sheet 46 has been fabricated using an additive manufacturing process. For example, the face sheet 46 is formed on the cellular structure 48 such that the face sheet 46 is fused directly to the walls of the cellular structure such that no adhesive is required. The slots 50 of the face sheet 46 are aligned with the cells of the cellular structure 48 and do not overlap the walls of the cells. The face sheet 46 is also made of a polymer that varies in hardness. For example, the region at 64*a* has a first hardness and the region at 64*b* has a second, different hardness. The variation in hardness can be tailored to provide toughening to endure harsh environments (i.e., ice impact). This may further enable a greater area of a liner to be acoustically treatable to absorb sound while also being durable against ice impact.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An acoustic liner for a gas turbine engine, comprising:
an acoustic panel that is curved about a central axis, the acoustic panel including, a support backing,
a face sheet having a radially inner face, and
a cellular structure disposed between the support backing and the face sheet,
the face sheet having elongated slots that are elonagted along respective slot centerlines, the slot centerlines being in the plane of the radially inner surface of the face sheet, the slot centerlines being sloped at oblique angles to the central axis, wherein the face sheet varies in hardness.

2. The acoustic liner as recited in claim 1, wherein each said elongated slot defines a slot length (L) and a slot width (W), and a ratio of L to W is from 2 to 10.

3. The acoustic liner as recited in claim 1, wherein the elongated slots are arranged in multiple circumferential rows.

4. The acoustic liner as recited in claim 1, wherein each said elongated slot defines a slot width (W), the elongated slots define a slot-to-slot spacing (S), and a ratio of S to W is from 2 to 10.

5. The acoustic liner as recited in claim 1, wherein the elongated slots are linear.

6. The acoustic liner as recited in claim 1, wherein the elongated slots are parallel to each other.

7. The acoustic liner as recited in claim 1, wherein the oblique angles are from 37° to 65°.

8. The acoustic liner as recited in claim 1, wherein each said elongated slot defines a slot length (L) and a slot width (W), a ratio of L to W is from 2 to 10, the elongated slots are arranged in multiple circumferential rows, the elongated slots define a slot-to-slot spacing (S), and a ratio of S to W is from 2 to 10.

9. The acoustic liner as recited in claim 1, wherein each said elongated slot defines a slot width (W), said face sheet defines a thickness (T), said width (W) is from 0.005 to 0.07 inches, and said thickness (T) is from 0.02 to 0.1 inches.

10. The acoustic liner as recited in claim 1, wherein said elongated slots are arranged in adjacent slot patterns, each said elongated slot defines a slot width (W), each one of said adjacent slot patterns defines a minimum pattern-to-pattern gap (G), and a ratio of said pattern-to-pattern gap (G) to said slot width (W) is 2 or greater.

11. The acoustic liner as recited in claim 1, wherein each of the elongated slots defines a slot thickness, a slot width, and a slot length, the slot length is greater than each of the slot thickness and the slot width, and the centerlines are taken along the slot lengths.

12. A gas turbine engine, comprising:
a fan operable to rotate in a rotational direction about a central engine axis to provide propulsion;
a fan case surrounding the fan, the fan case including an acoustic liner downstream of the fan and having one or more acoustic panels, the one or more acoustic panels being curved about the central engine axis, wherein each said acoustic panel includes, a support backing, a face sheet, and a cellular structure disposed between the support backing and the face sheet, the face sheet having slots extending along respective slot centerlines in the plane of the face sheet and collectively having a slot texture, each said slot defining an axially aft slot end and an axially forward slot end, the axially forward slot end being circumferentially forward of the axially aft slot end relative to the rotational direction of the fan, a directionality along the slot centerlines from the axially forward slot end to the axially aft slot end, the directionality defining the slot texture, wherein the rotational direction of the fan is against the directionality of the slot texture.

13. The gas turbine engine as recited in claim 12, wherein each said slot defines an axially aft slot end and an axially forward slot end, the axially forward slot end being circumferentially forward of the axially aft slot end relative to the rotational direction of the fan, each said slot is elongated and defines a slot length (L) and a slot width (W), a ratio of L to W is from 2 to 10, the slots are arranged in multiple circumferential rows, the slots define a slot-to-slot spacing (S), and a ratio of S to W is from 2 to 10.

14. The gas turbine engine as recited in claim 12, wherein the face sheet varies in hardness.

15. A method of fabricating a face sheet for an acoustic liner, the method comprising:

forming a face sheet by additive manufacturing, wherein the face sheet has a radially inner surface that is curved about a central axis and that has elongated slots that are elongated along respective slot centerlines in the plane of the radially inner surface of the face sheet, wherein the slot centerlines are sloped at oblique angles to the central engine axis and the additive manufacturing uses polymers of different hardnesses such that the face sheet varies in hardness.

16. The method as recited in claim 15, wherein the face sheet is formed on a cellular structure and the slot centerlines are sloped at oblique angles to the central axis.

17. The method as recited in claim 16, wherein the elongated slots are formed in alignment with cells of the cellular structure.

18. The method as recited in claim 16, wherein the face sheet is fused directly to the cellular structure without an adhesive.

* * * * *